United States Patent
Tai et al.

(10) Patent No.: US 9,191,351 B2
(45) Date of Patent: Nov. 17, 2015

(54) REAL-TIME FRAUDULENT TRAFFIC SECURITY FOR TELECOMMUNICATION SYSTEMS

(75) Inventors: Alan Tai, Hillsborough, NJ (US); Carlos Miranda, Deerfield Beach, FL (US); Brian Dowd, Beachwood, NJ (US)

(73) Assignee: Tata Communications (America) Inc., Herndon, VA (US)

( * ) Notice: Subject to any disclaimer, the term of this patent is extended or adjusted under 35 U.S.C. 154(b) by 180 days.

(21) Appl. No.: 13/524,580

(22) Filed: Jun. 15, 2012

(65) Prior Publication Data

US 2013/0336169 A1    Dec. 19, 2013

(51) Int. Cl.
*H04M 3/42* (2006.01)
*H04M 1/66* (2006.01)
*H04L 12/58* (2006.01)

(52) U.S. Cl.
CPC ...................................... *H04L 51/12* (2013.01)

(58) Field of Classification Search
CPC ...................................................... H04Q 7/34
USPC .......................... 370/252, 335, 342, 392, 235; 379/189–218; 455/410, 411
See application file for complete search history.

(56) References Cited

U.S. PATENT DOCUMENTS

| | | | |
|---|---|---|---|
| 5,463,681 A * | 10/1995 | Vaios et al. | 379/189 |
| 6,404,864 B1 | 6/2002 | Evslin et al. | |
| 6,516,056 B1 * | 2/2003 | Justice et al. | 379/145 |
| 6,594,481 B1 * | 7/2003 | Johnson et al. | 455/410 |
| 8,208,955 B1 * | 6/2012 | Nelson | 455/550.1 |
| 8,532,089 B2 * | 9/2013 | Dalrymple et al. | 370/352 |
| 8,559,926 B1 * | 10/2013 | Zang et al. | 455/411 |
| 8,660,113 B1 * | 2/2014 | Canavan et al. | 370/352 |
| 2013/0163737 A1 * | 6/2013 | Dement et al. | 379/201.01 |

* cited by examiner

*Primary Examiner* — Edan Orgad
*Assistant Examiner* — Sithu Ko
(74) *Attorney, Agent, or Firm* — Kaplan Breyer Schwarz & Ottesen, LLP

(57) ABSTRACT

Fraudulent VoIP calls are detected and blocked by automated procedures performed at a router server in the VoIP service provider's system which, usually, just analyzes call requests and sets up a route between the calling and called parties. The stringency of automated fraudulent call detection and blocking processes is based on calling customer credit worthiness and the destination of the call.

5 Claims, 2 Drawing Sheets

REAL-TIME FRAUDULENT TRAFFIC SECURITY FOR TELECOMMUNICATION SYSTEMS

BACKGROUND OF THE INVENTION

The present invention relates generally to telecommunications and, in one preferred embodiment, concerns a method and apparatus for achieving real-time fraudulent traffic security for Internet telephony, also known as Voice over Internet Protocol (VoIP) telephony.

Today, the field of Internet telephony has proven to be a viable technology and is evolving at an ever increasing rate. Moreover, it is now common to use any type of telephone terminal, handset, cell phone, etc. to initiate or receive a VoIP call by connecting to the public switched telephone network (PSTN) to access a gateway, the call travelling through the Internet to a remote party via one or more gateways.

The PSTN is a circuit switched network. That is, the PSTN assigns a dedicated communication line to a user with which to complete the telephone call, and the user can utilize the assigned resource of the PSTN in any way he chooses. It is understood that the user is paying for the use of the dedicated resource of the PSTN. While the circuit switched approach of the PSTN system is not necessarily the most efficient system in terms of call traffic (i.e., it does not make use of the "dead space" common in a conversation), it is relatively easy to ensure that information destined for a particular user is delivered. The PSTN provides a dedicated line to complete the transaction.

The Internet is a packet switched network in which communication is accomplished by breaking the transmitted data into "packets", based primarily on communication content, and interleaving the packets to best utilize the bandwidth available at any given time on the Internet. When the packets reach their intended destination, they must be reassembled into the originally transmitted data. Loss of packets, and thus data, occurs frequently in such a network, and the ability of the network to successfully transmit information from one point in the network to another determines the quality of the network. For inter-computer communication transactions involving non real-time data, the ability to transmit packets and retransmit any packets that are perceived to have been dropped is not a severe limitation and may not even be perceived by the user of the system. However, in a voice communication transaction, the delay required to retransmit even one data packet may be perceived by a user.

A system of gateways disposed on the Internet facilitates VoIP telephony by permitting the gateways to act as protocol bridges between the PSTN and the Internet. Typically, a VoIP service provider will operate a VoIP network which can facilitate a VoIP call that traverses both PSTN networks and packet switched networks like the Internet. The originator of a VoIP call may use a standard telephone connected to a first PSTN to dial a telephone number of another person on a second PSTN. A trunk line of the first PSTN connects to an originator gateway (server) that connects the first PSTN to a packet switched network, such as the Internet. The initiator gateway sends its position in the network along with the telephone number of the call recipient (within the second PSTN) to a route server, which determines which of many other gateways should be used to complete the call to the telephone number in the second PSTN and transmits this information to the initiator gateway. A call connection is then established between the originator gateway and a terminator gateway serving the second PSTN, which may involve routing the call through a number of intermediate servers on the Internet. The terminator gateway completes the call to the called party by connecting to the second PSTN.

The connection of a call between users on PSTNs is just provided as an example. Those skilled in the art will appreciate that the users need not necessarily communicate via a PSTN. In general, a call will be considered as originating with a customer of the VoIP service provider and being destined to a call recipient (regardless of the type of connection to the customer or the recipient).

The VoIP service provider typically generates revenue, at least in part, by buying and reselling call completion services. That is, when an originator gateway in the United States, for example, needs to complete a call to Luxembourg, for example, the VoIP provider will cause the originator gateway to send that call through a particular terminating gateway that can terminate the call off the Internet and complete it to its final destination in Luxembourg. The VoIP service provider will pay the terminating gateway operator a fee, say fifty cents per minute, for such termination services, but will charge the operator of the originator gateway fifty five cents per minute, for example, for such termination services to Luxembourg. The five cent difference is the VoIP service provider's profit.

Further details of techniques used in furtherance of the foregoing are described in commonly owned U.S. Pat. No. 6,404,864, ("the '864 patent") assigned to the same assignee as the present application. The disclosure of the '864 patent is hereby incorporated by reference in its entirety.

The business model is viable in large part due to the fact that the various carriers that operate around the world often do not have individual contractual relationships with each other. The VoiP service provider thus acts, in a loose sense, as a matching service that matches those seeking to send calls to specific destinations, with those seeking to earn money by terminating such calls in those destinations. The contractual relationships required however, are typically between the various carriers that operate the originating and terminating gateways, and the VoiP service provider.

If the VoIP service provider contracts for termination services with a particular terminating gateway operator, for a particular originating gateway, and the operator of the originating gateway does not pay the VoIP service provider for such services, the VoIP service provider will still be contractually bound to pay the terminating gateway operator. This results in loss of revenue, and often happens in the case of fraud or hacking Specifically, if someone hacks into the local network connected to an originating gateway, they can send fraudulent calls to the VoIP service provider. The operator of the originating gateway may not pay for those calls, and the VoiP service provider will have contracted with a terminating gateway operator for completion of those calls. Hence, a loss of revenue to the VoIP service provider results.

Further, an originating gateway operator may be a small carrier without a sophisticated security system. It is thus often possible for a malicious source to breach a system and relay malicious traffic to the VoIP service provider, which appears to be legitimate customer traffic, without the customer (i.e.; the originating gateway operator) even being aware. The VoIP service provider is ultimately responsible to remunerate the downstream service providers, and often the defrauded customer is too small to assume the financial losses, or not legally responsible.

One serious problem is that the fraudulent traffic may not be discovered until days or weeks later, when call detail records ("CDR") show an unusually high amount of traffic and unusually high charges to a specific destination, for example. Another problem is that the fraud that results in loss to the VoIP service provider is often fraud committed against one of the carriers' networks, not directly against the VoIP service provider. Hence, it is difficult for the VoIP service provider to manage it, even though the resulting loss is largely borne by the VoIP service provider.

The VoIP service provider must play a delicate balancing act between not being overzealous, allowing legitimate traffic from customers to flow to high risk (expensive) destinations even when the volume increases, and being exposed to significant financial losses if it does not properly and quickly react to situations that do, in fact, involve fraudulent traffic from trusted customers.

SUMMARY OF THE DISCLOSURE

In accordance with the present disclosure, fraudulent calls are detected and blocked by automated procedures performed preferably at a route server in the VoIP service provider's system, which analyzes call requests and sets up a route between the calling and called parties.

In an exemplary embodiment, call statistics are used in a first test to determine if fraud is suspected. If so, further statistics are tested in at least a second test. If the first and second tests indicate fraud, the call is blocked. If only the first test indicates fraud, the call is not blocked but a warning message is sent to the operator of the originating gateway.

In accordance with an additional embodiment, the stringency of automated fraudulent call detection and blocking processes is based on calling customer credit worthiness, destination of the call.

In accordance with another aspect of the present disclosure, automated fraudulent call detection blocking processes use as criteria the number of call attempts during a given time period, the number of call attempts in comparison to a rolling average over a given time period, and/or whether the calling number is an invalid or suspicious number or one previously found to originate fraudulent calls.

While preferably implemented in a VoiP network the invention is applicable to fraud detection in any network over which calls are routed.

BRIEF DESCRIPTION OF THE DRAWINGS

The foregoing and other objects, features, and advantages of the present disclosure will be understood more completely from the following detailed description of a presently preferred, but nonetheless illustrative, embodiments, with the reference being had to the accompanying drawings, in which.

DETAILED DESCRIPTION

Figure 1:
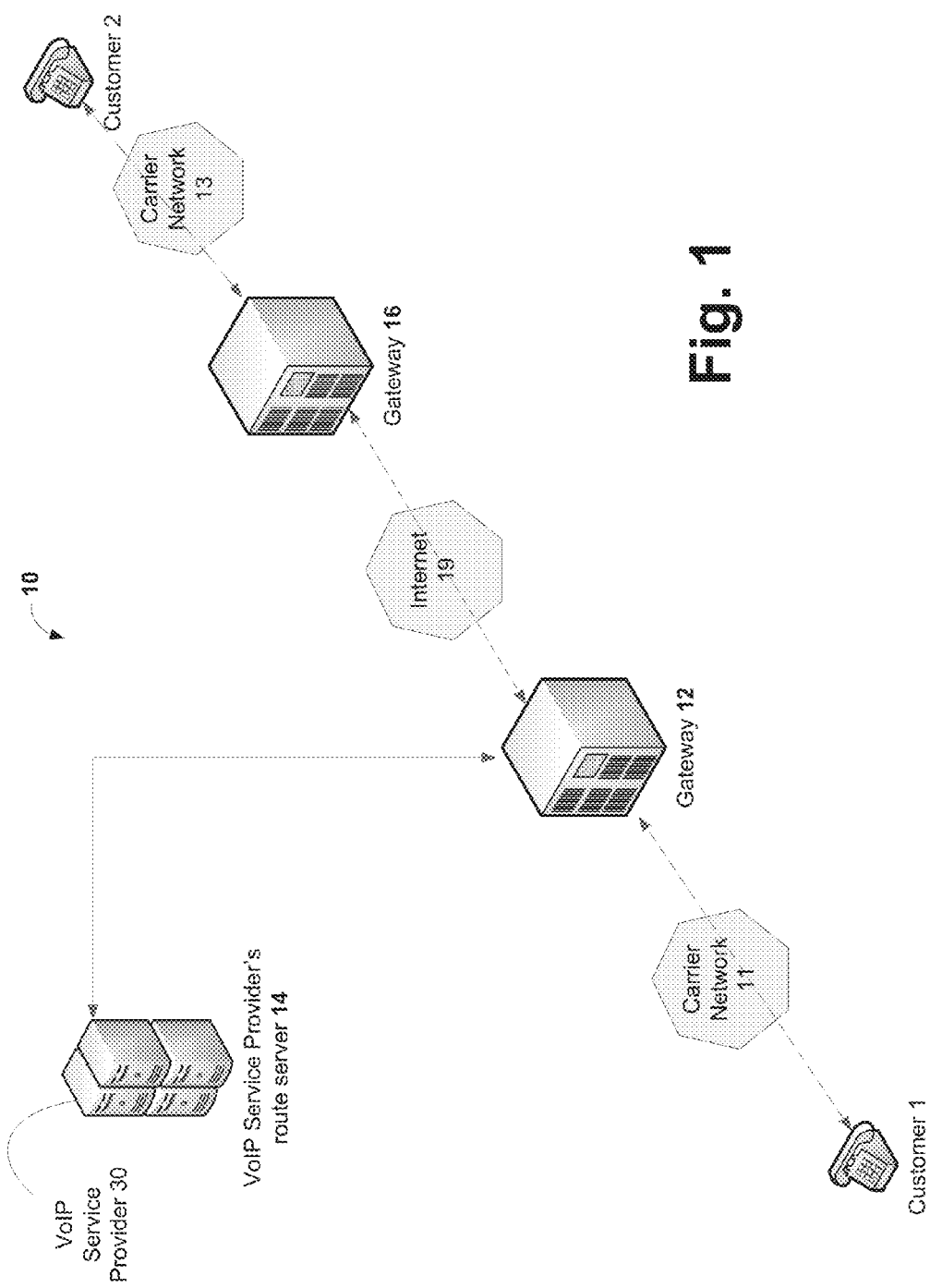
FIG. 1 is a schematic block diagram illustrating a system 10 which incorporates an exemplary embodiment of the present invention.

Turning now to the drawings, FIG. 1 is a schematic block diagram illustrating a system 10 which incorporates an embodiment of the present invention. Only two gateways 12 and 16 are labeled shown for simplicity and purposes of explanation, although it is understood that in actuality, the gateways may be part of a large network of such gateways disposed throughout the world. A small number of such additional gateways G are shown.

Additionally, while gateways are discussed herein, the term gateway, as used herein, is not limited to the conventional meaning of a gateway, but instead is meant to encompass any network element that may communicate with another network element to convey a call over a network. Thus, switches, routers, etc. are also encompassed within such definition.

A voice telecommunications customer 1 wishes to place a call to a voice customer 2. Customer 1 initiates the call over a carrier network 11, which typically but not necessarily comprises a local PSTN network. The carrier network determines the call is to be routed as a VoIP call through gateway 12. In furtherance thereof, the carrier network 11 accesses gateway 12, which processes the call and passes it to a route server 14, operated by a VoIP service provider. Server 14 is a commonly employed device which analyzes a call request and sets up a route, usually through a series of downstream gateways, for the transmission between customer 1 and customer 2. Server 14 may communicate with all the gateways around the network via the Internet or some other private network.

When gateway 12 receives the call from customer 1, gateway 12 may contact route server 14 in order to obtain information telling gateway 12 to where on Internet 19 the call should be routed. A function of route server 14 is to assign a terminating gateway, e.g.; gateway 16, to complete the call. Media may then flow from gateway 12 to gateway 16 over the Internet 19. Generally, each VoiP call to be routed over Internet 19 will include an originating gateway for placing the VoiP call on the Internet 19, and a terminating gateway (e.g.; gateway 16) for taking the call off the Internet and completing it over the remote carrier, shown as 13 in FIG. 1.

In accordance with the present invention, server 14 incorporates fraud detection programming (discussed further below), which determines whether to block or route the call, and also determines whether to issue a warning to the operator of the originating gateway network. Should server 14 choose to block the call, gateway 12 informs the operator of carrier network as well. On the other hand, should server 14 decide to route the call, its instructions include the planned route, and the call is transferred online, possibly through a series of gateways, until it reaches a gateway 16, to which customer 2 is connected. When customer 2 answers, connection of the call is completed.

As described above, if VoiP service provider 30, the operator of route server 14, causes the operator of carrier network 2 to complete the call through gateway 16, then VoiP service provider 30 will incur liability to the operator of carrier network 2. If customer 1 hacked into carrier network 1, or if a rogue carrier hacked into gateway 12 by pretending to be carrier network 1, then service provider 30 will not be paid any revenue and will suffer a loss.

To attempt to detect fraudulent calls in or near real time, each request to route server 14 from a gateway is examined for potential fraud. It may be subjected to a series of tests, one or more of which result in a warning being issued to the originating carrier network 1, although the call is nonetheless completed. The results of others of the tests may result in the call being blocked. In an embodiment, if one or more first tests are passed, only then are the second one or more tests conducted.

The first one or more tests may relate to whether the call is destined for a predetermined geographic area. Certain destination areas present a higher risk of fraud due to the fact that calls to such destinations are relatively costly, represent a more profitable alternative for fraudsters. Below we describe, with respect to FIG. 2, one exemplary embodiment, followed by a discussion of other embodiments as well.

Figure 2:
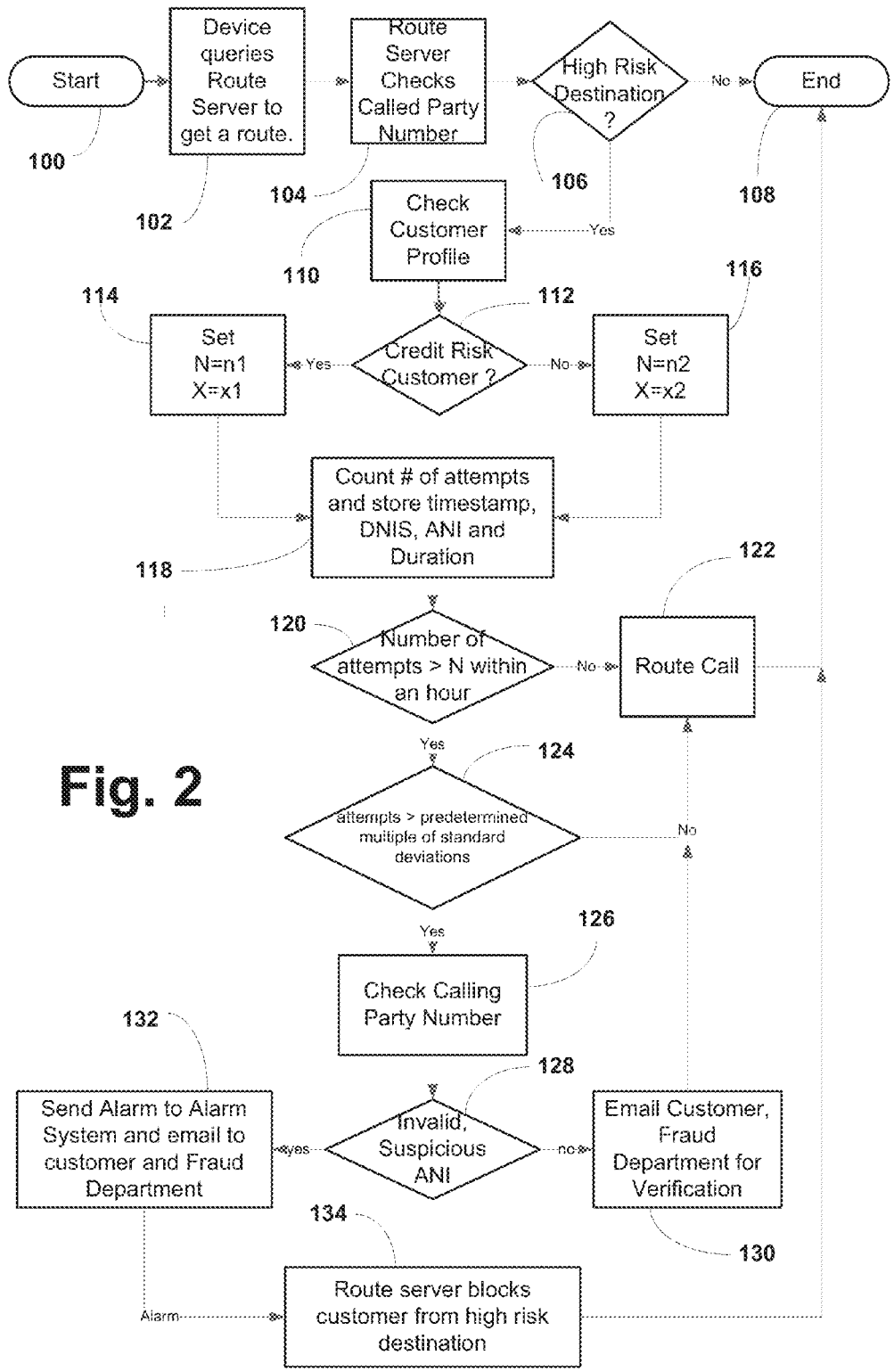
FIG. 2 is a flow chart illustrating a preferred process for detecting and blocking fraudulent calls in accordance with an exemplary embodiment of the present invention.

FIG. 2 is a flow chart illustrating an exemplary process for detecting and blocking fraudulent calls in accordance with the present invention. This process is preferably performed at route server 14. The process starts at block 100 and, at block 102 a device (e.g. customer 1 telephone) places a call, which is routed to a gateway such as 12. The gateway queries the route server for a route for a call it wants to place. Usually, this route involves supplying gateway 12 with the IP address of a gateway capable of terminating the call.

At block 104, the route server checks the called party number and then, at block 106, performs tests to determine whether the called party is in a "high risk" destination. If not, the process ends at block 108, and the route server routes the call. A "high risk" destination will be understood as one which incurs high downstream fees or, based upon historical information, one that has been a target for fraudulent calls.

Should the test at block 106 determine that a high-risk destination has been called, processing continues at block 110, where the profile of the calling customer is checked. At block 112, a test is performed to determine whether the calling customer is a credit risk. If so, control transfers to block 114, where a threshold N is set equal to n1 and a threshold X is set equal to x1 and control transfers to block 118. On the other hand, if the test at block 112 determines that the calling customer is not a credit risk, threshold N is set equal to n2 and threshold X is set equal to x2, and control transfers to block 118. Thus, different thresholds may be set, (to be used below) depending on the customer's credit worthiness. These thresholds generally represent the amount of calls a customer will be permitted to complete and thus, indirectly represent the value of the receivable that the VoiP service provider is willing to permit.

At block 118, the route server determines the number of attempts to place the present call, and stores a timestamp, the Data Number Identification Service (DNIS) information and the automatic number identification (ANI) information for the call, as well as its duration. A test is then performed at block 120 to determine whether the number of calls attempts within a predefined interval T1, for example an hour, exceeds the value of threshold N. If not, the route server routes the call (block 122), and control transfers to block 108, where the process ends.

Should the test at block 120 indicate that the value of threshold N has been exceeded, control transfers to block 124, where a test is performed to determine whether the number of call attempts over a prescribed time exceeds a predetermined number of standard deviations, such standard deviations being measured along a distribution curve of call attempts. If not, the call is routed (block 122), and control transfers to block 108, where the process ends. This last test avoids false alarms when a customer is legitimately sending traffic to a high risk destination.

Should the test at block 124 yield a positive result, an unusually high temporary rate of call attempts is indicated, and control is transferred to block 126, where the calling party's number is checked. A test is then performed at block 128 to determine whether this calling number is invalid or has a suspicious ANI. A suspicious ANI would include a number that has previously generated fraudulent activity, or one with invalid digits or area code, or other abnormalities.

If the calling number passes the test at block 128 (not suspicious or invalid calling number), an e-mail is sent to the customer and the fraud department at the VoiP service provider for verification (block 130). In the mean time, control is transferred to block 122, where the call is routed and thereafter to block 108, where the process ends. This path represents the idea that there is a sudden burst in the amount of traffic from a legitimate number. Rather than block what might be legitimate traffic, the system can warn the originating carrier while routing it.

Alternatively, the VoiP service provider could request, after block 130 is executed, verification for routing of future calls from that calling number. In this manner, calls from what appears to be a legitimate source will not be blocked, but if the traffic from that source appears suspicious, the originating carrier will have to verify that traffic going forward. Optionally, the VoiP service provider could block such calls in the future if proper verification is not provided. Such a measure strikes a balance between blocking what might be legitimate calls from a real customer, with avoiding a huge accumulation of fees owed to the VoiP provider which, if the source is not legitimate, may not be paid.

Should the test at block 128 have a positive result, the calling number is invalid or suspicious), and an alarm is sent to the customer and fraud department (block 132), and control transfers to block 134, where the route server blocks the call to the high risk destination. Control then transfers to block 108, where the process ends.

The above strikes a balance between several competing requirements related to detection and possible blocking of fraudulent calls in near real time. Specifically, in order to compare the number of attempts in a given time frame to a past average or other statistic, for each call, would be computationally too expensive. Therefore, the system does this comparison only for call identified as high risk calls, such as those to high risk destinations. Generally, the route server may preferably perform a two step process whereby high risk calls are identified, and then, a process to detect fraud is executed.

Further, the process executed when fraud is suspected may itself be a two step process. As the above example demonstrates, when a high risk destination or geographic area is identified, the process executed includes two additional steps which may result in either the call being completed with a warning being sent to the originating carrier, or the call being blocked entirely, depending upon whether block 128 of FIG. 2 transfers to block 132 or block 130. In a preferred embodiment, the entire fraud detection algorithm may be implemented on the route server, so that the route server, based upon call characteristics, either routes the call as normal, routes the call but sends a warning message to the originating carrier, or blocks the call.

The described process avoids an unnecessarily burdensome processing load by monitoring only calls made to high risk destinations, while stepping through numerous tests to ascertain if the call should be simply routed as usual, routed with a warning sent to the originating network operator, or blocked. In other embodiments, algorithms in which the route server compares the call to past statistics are selectively executed based upon whether or not the call is destined for a high risk destination.

Although a preferred embodiment of the invention has been disclosed for illustrative purposes, those skilled in the art will appreciate that many additions, modifications and substitutions are possible, without departing from the scope and spirit of the invention as defined by the accompanying claims.

What is claimed is:

1. A method for interfacing between a first network that is provided by a first telecommunications carrier and a second network that is provided by a Voice over Internet Protocol (VoIP) service provider, said method comprising:

receiving, at said second network, a request to provide telecommunications services to said first network, said request having been received by said first network from a customer of said first network through a first gateway;

examining, by said second network in response to said request, past statistics relating to requests for telecommunications services that originate from said first network and terminate into a third network that is provided by a second telecommunications carrier, wherein said first and second networks are separated by said first gateway, wherein said second and third networks are separated by a second gateway, and wherein said examining results in one of at least three results;

if said examining yields a first result, servicing said request;

if said examining yields a second result, sending a warning message to said first network from said second network; and if said examining yields a third result, blocking said telecommunications services from being completed;

wherein at least two of said results cause said second telecommunications network to examine identifying information associated with said customer of said first network.

2. The method of claim 1 wherein said second network sends a message to said first network to inform said first network that said customer of said first network may be committing fraud against said first network.

3. A method for blocking fraudulent calls in a Voice over Internet Protocol (VoIP) telephony system, the system including a route server which receives calling party requests for a route to a called party, the method comprising:

routing calls, by the server, except when the called party is located in one of a group of predefined high risk destinations;

when the called party is located in one of a group of predefined high risk destinations, determining by the server the calling party's credit worthiness and determining, by the server, whether the number of call attempts within a predetermined time from the calling party exceeds a threshold value, the threshold value being determined by the calling party's credit worthiness; and routing the call, by the server, only if the number of attempts does not exceed the threshold value;

if the number of attempts does exceed the threshold value, determining by the server whether the number of call attempts within a predetermined time exceeds a rolling average of the number of calls within that predetermined time by a threshold percentage, the threshold percentage being determined by the calling party's credit worthiness; and routing the call, by the server, only if the number of call attempts within a Predetermined time does not exceed the rolling average of the number of calls within that predetermined time by the threshold percentage.

4. A route server comprising:

an interface for receiving a query, from a network that is provided by a first telecommunications carrier, for a route for a call to a network that is provided by a second telecommunications carrier; and a processor for identifying high risk calls, for processing only said high risk calls through an algorithm that classifies said high risk calls into categories, and, in response to a classification into one of the categories, for supplying the route for the call and issuing a warning, wherein future calls having prescribed characteristics will be blocked unless a specific verification message is received prior to said future calls requiring routing;

wherein the network provided by the first telecommunications carrier and the route server are separated by a first gateway, and wherein the route server and the network provided by the second telecommunications carrier are separated by a second gateway; and wherein the algorithm that classifies calls performs such classification for a specific call based at least upon a calling number of said specific call and a rolling average of calls to a destination of said call.

5. The route server of claim 4 wherein said algorithm that classifies calls determines and uses for such classification an geographic area associated with said call.

* * * * *